UNITED STATES PATENT OFFICE.

ARTHUR CONROY AND MICHAEL CONROY, OF LIVERPOOL, COUNTY OF LANCASTER, ENGLAND.

COFFEE COMPOUND OR SUBSTITUTE.

SPECIFICATION forming part of Letters Patent No. 268,869, dated December 12, 1882.

Application filed September 25, 1882. (No specimens.) Patented in England October 28, 1881, No. 4,719.

*To all whom it may concern:*

Be it known that we, ARTHUR CONROY and MICHAEL CONROY, both of Liverpool, in the county of Lancaster, England, have invented certain new and useful Improvements in Beverages, (for which we have received Letters Patent in England, No. 4,719, dated October 28, 1881;) and we do hereby declare that the following is a full, clear, and exact description of the invention, which will enable others skilled in the art to which it appertains to make and use the same.

This invention is designed with the object of producing a substitute for coffee that will be much more nutritious and digestive than pure coffee.

The mode of preparation is preferably as follows: Roasted ground coffee is exhausted by percolation with water at a temperature of 212° Fahrenheit, and the resulting percolate is incorporated with a mixture, in powder, of raw malt and malt that has been roasted in the same manner as ordinary coffee-berries. The product is then thinly spread on suitable trays, and dried at a temperature not exceeding 140° Fahrenheit.

The proportion of coffee-extract can be greatly varied, and, if desirable, the malt already treated with extract and dried can be a second time treated, so as to saturate the malt; or an equivalent amount of roasted coffee can be added to the malt instead of part of the coffee-extract, the main object being to combine coffee and raw and roasted malt, so that the mixture shall contain the special qualities of each of the ingredients.

In actual manufacture we have found the following proportions give as good results as any, and produce an article possessing the flavor and stimulating properties of coffee, combined with the nutritive and digestive properties of malt, namely: To equal parts of raw and roasted malt saturated with coffee-extract obtained from a corresponding weight of coffee, and dried as described, add twice their weight of roasted coffee-berries and grind the whole in a mill.

In speaking of malt we do not wish to confine ourselves to barley-malt exclusively, as other malted grain may be employed, and, if so, an inferior but drinkable quality of coffee mixture may be formed; but malt made from barley we consider gives by far the best result. We also sometimes, instead of using an extract of coffee, use ordinary roasted coffee and mix it with the two varieties of malt.

The roast malt adds to the flavor, and is a good coffee substitute, but could be dispensed with. The raw malt is the ingredient that makes our coffee so digestible, as it is that which contains the diastase.

We are aware that roasted malt has before been mixed with coffee, and this we do not claim broadly.

We claim as our invention—

1. The herein-described compound, consisting of roasted coffee and raw and roasted malt saturated with coffee-extract, the whole combined in substantially the proportions stated, and ground.

2. The herein-described method of preparing a coffee compound or substitute, which consists in causing water at about 212° Fahrenheit to percolate through roasted coffee, incorporating the extract thus produced with a powdered mixture of raw and roasted malt, spreading the product and drying at a temperature not exceeding 140° Fahrenheit, and finally mixing the dried product with roasted coffee and grinding the whole in a mill.

ARTHUR CONROY.
MICHAEL CONROY.

Witnesses:
WM. P. THOMPSON,
C. SOUTHALL.